United States Patent [19]

Yoshida

[11] 4,088,912

[45] May 9, 1978

[54] BRUSH DEVICE FOR MINIATURE ELECTRIC MOTOR

[75] Inventor: Makoto Yoshida, Tokyo, Japan

[73] Assignee: Aupac Kabushiki Kaisha, Japan

[21] Appl. No.: 718,113

[22] Filed: Aug. 27, 1976

[30] Foreign Application Priority Data

Sep. 2, 1975 Japan .......................... 50-121166[U]

[51] Int. Cl.[2] .............................................. H02K 13/00

[52] U.S. Cl. .................................... 310/244; 310/246; 310/248

[58] Field of Search ............... 310/239, 292, 242, 296, 310/248

[56] References Cited

FOREIGN PATENT DOCUMENTS 2,413,578 10/1975 Germany ............................ 310/292

*Primary Examiner*—Donovan F. Duggan

[57] ABSTRACT

A brush device for a miniature electric motor of a construction, in which a brush comprising a brush main body and a brush head part having a smaller size than the brush main body is forcibly inserted into an opening of a substantially corresponding size shape to the brush head part which is perforated in one part of a brush holder made of a leaf spring in a strip of narrow breadth, and an electrically conductive adhesive agent is applied to a fitted portion of the brush head part and the perforated opening, depending on necessity, stages or shelves formed at the boundary of the brush head part and the brush main body due to difference in size therebetween serving as stopper means which stops further insertion of the brush upon full, forced insertion of the brush head part into and through the perforated opening.

11 Claims, 5 Drawing Figures

BRUSH DEVICE FOR MINIATURE ELECTRIC MOTOR

BACKGROUND OF THE INVENTION

This invention is concerned with a brush device for a miniature electric motor.

It has so far been a general practice that the brush device for the miniature electic motors is made as simple a construction as possible by causing the brush made by powder-forming on a leaf spring of beryllium-copper alloy having a thickness of 0.15 mm or so, for example, to be held on the commutator portion of the motor, thereby utilizing the leaf spring as a brush holder, an electrically conductive body, and a contact-pressure holding body.

In the brush device of the above-described construction, the brush per se is made of such materials having a high metal content, and also it is made of such other materials having a high graphite content. When the metal-graphite brush of high metal content is to be mounted on the leaf spring, it is done in such a manner that a head part of the brush in a rectangular form is fitted into a hole or opening perforated in the leaf spring serving as a brush holder, and the reactangular head part of the brush protruded from the perforated hole or opening in the brush holder made of the leaf spring is caulked so as to fixedly secure the brush to the brush holder. In this case, an electrically conductive adhesive agent may also be applied to the caulked part of the brush as an additional reinforcing expedient to ensure rigid fixation of the brush to the leaf spring holder.

On the other hand, when the metal-graphite brush of high graphite content is to be mounted on the brush holder made of the leaf spring, the afore-mentioned caulking expedient cannot be adopted, because the brush per se is very brittle. In this case, therefore, the brush is mounted on the brush holder in such a manner that a resilient lining member is first fitted onto and along a pair of opposing sides of the opening perforated in the leaf spring holder, and then the rectangular head part of the brush is intromitted into opening, and, while holding the brush by the abovementioned resilient lining member, an electrically conductive adhesive agent is applied to the fitted part between the brush and the perforated opening, to which the brush contacts, thereby fixedly securing the brush to the leaf spring holder. It goes without saying that this reinforcing expedient may be applied to the first-mentioned case where the brush to be mounted on the leaf spring holder is made of the material of high metal content.

The brush device manufactured in accordance with the above-mentioned conventional technique, however, has been replete with various problems mainly in respect of its industrialized mass-production, hence expected reduction in cost of manufacture of the miniature electric motor for controlling purposes in various kinds of automatically operated apparatuses and appliances, the demand for which in the market has been, and is, extremely high. The source of such problem resides in its necessity for considerable number of manufacturing steps in assembling the brush and the leaf spring holder by caulking as well as in mounting the resilient lining member on the leaf spring holder.

SUMMARY OF THE INVENTION

In view of the above-described points of problem inherent in the brush device manufactured by the conventional technique, it is the primary object of the present invention to provide an improved brush device, in which assembling structure of the brush and the leaf spring holder is made simple so as to enable the assembling work to be conducted in an automatic manner, and also to enable the industrialized mass-production to be readily practiced to result in reduction in the manufacturing cost as desired.

It is the secondary object of the present invention to provide an improved brush device, in which the brush is securely and rigidly assembled to the leaf spring holder, and the electric conductivity from the brush to the leaf spring holder is maintained stable.

According to the present invention, generally speaking, there is provided a brush device for a commutator of a miniature electric motor, which comprises in combination: (a) a brush holder made of a leaf spring having an opening perforated in one part thereof to hold therein the brush, and having a fitting part to fix the same to the main body of the electric motor formed at the other part thereof; and (b) a brush of a size adapted to be inserted and held in the opening perforated in the brush holder, the brush consisting of a main body and head part integrally formed on the main body in a size different from the main body, and the head part being forcibly inserted into the perforated opening in the brush holder.

The foregoing objects, other objects as well as specific construction, and manner of assembling the brush with the leaf spring holder in accordance with the present invention will become more apparent and understandable from the following detailed description thereof, when read in conjunction with the accompanying figures of drawing which illustrate a preferred embodiment of the invention.

DETAILED DESCRIPTION OF PREFERRED EMBODIMENT OF THE INVENTION

Figure 1:
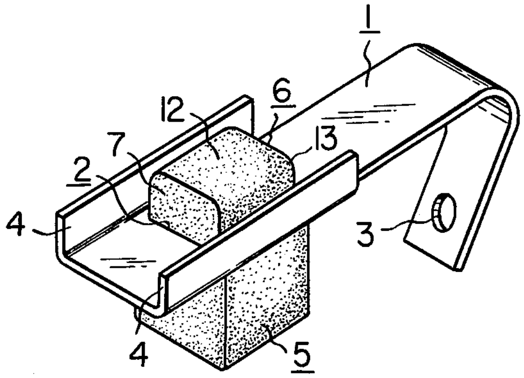
FIG. 1 is a perspective view in general of one embodiment of the brush device according to the present invention.

The present invention will now be explained with reference to a preferred embodiment thereof as shown in the drawing.

Figure 2:
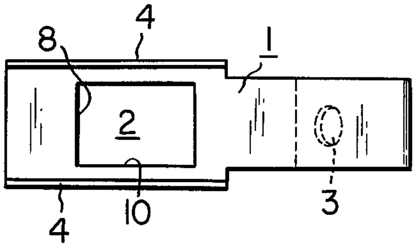
FIG. 2 is a plan view of a leaf spring holder for use in the brush device according to the present invention.

Referring particularly to FIGS. 1 and 2, a brush holder 1 made of a leaf spring in a thin reactangular form having a narrow breadth is bent in an inverted L-shape, at one end part of which a rectangular hole or opening 2 is perforated for holding the body of the brush as inserted therein, and, at the other end part of which a small hole 3 is formed for fixedly securing the leaf spring holder 1 to the main body of a motor.

In the case of fitting a lead wire to this leaf spring holder 1, there are adopted various expedients such that the lead wire is directly attached to the holder by soldering, or it is soldered to a flap which is provided on the leaf spring holder.

The edges at both sides of the leaf spring holder 1 in the neighborhood of the perforated hole 2 is bent either upwardly or downwardly along the longitudinal direction thereof to constitute reinforcement flanges 4, 4.

Figure 3:
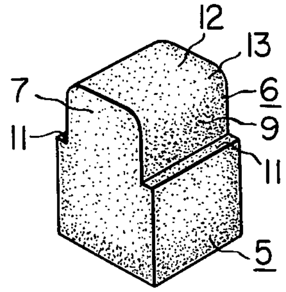
FIG. 3 is a perspective view of the brush for use in the present invention.

As specifically shown in FIG. 3, the brush comprises a main body 5 and a rectangular head part 6 which is integral with the main body 5.

Breadth of one of the mutually opposing pairs of the parallel side surfaces 9, 9 at the head part 6 is substantially same as the length of the two opposing sides 10, 10 of the perforated hole or opening 2 in the leaf spring holder 2, while breadth of the other opposing pair of the parallel side surfaces 7, 7 at the head part 6 of the brush is made somewhat narrower than the breadth of the opposing pair of the parallel side surfaces 9, 9, but is slightly wider than the other two opposing parallel sides 8, 8 of the perforated opening 2 in the leaf spring holder 2, say, for example, 1.5 mm or so. As the consequence of this difference in the breadth between the head part 6 and the brush main body 5 of the brush at one of the pairs of the opposing parallel side surfaces, there is formed a pair of stages 11, 11 at the boundary of the brush main body 5 and the head part 6. This pair of stages 11, 11 serve as stopper means at the time of assembling the brush and the leaf spring holder to be described later. The edge parts formed by the top surface 12 of the head part 6 and both side surfaces 9, 9 thereof are chamferred. This chamferred parts 13 of the brush head part 6 will serve as a guide which enable the head part to be smoothly inserted into the perforated opening 2 in the leaf spring holder 1 at the time of assembling the brush to the holder as will be described hereinbelow.

Figure 4:
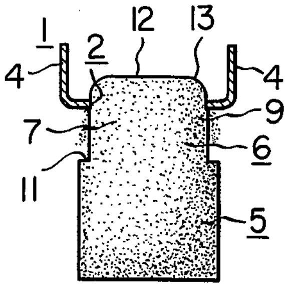
FIGS. 4 and 5 are respectively explanatory views of assembling the brush and the leaf spring holder to construct the brush device according to the present invention.
Figure 5:
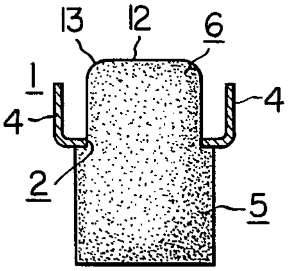

The assembly of the brush and the leaf spring holder is carried out in a manner as shown in FIG. 4. That is to say, the leaf spring holder 1 is fixed to the motor (not shown), and then the contiguous side surfaces 7 and 9 of the brush head part 6 are caused to match the contiguous two sides 8 and 10 of the perforated opening 2 in the leaf spring holder 1 respectively having corresponding lengths to the contiguous side surfaces 7 and 9 of the brush head part 6, after which the brush as a whole is pushed upward from the bottom part thereof in the arrow direction with the chamferred portions 13 of the brush head part 6 as the guide for insertion into the perforated opening 2 until the shelves or stages 11, 11 get in touch with the lower surface of the leaf spring holder 1, thereby forcibly inserting the brush into the perforated opening of the leaf spring plate.

In this forced intromission of the brush head part 6 into the perforated opening 2, when the brush is made of a material having high metal content, the brush head part 6 is snugly fitted into the perforated hole 2 in a manner as to causing the opening to be deformed to some extent due to the slightly expanded breadth of the side surfaces 7, 7 against the length of the sides 8, 8 of the perforated opening 2 as already described in the foregoing, whereby the brush head part 6 is strongly clamped and held at the brims of the opening 2 in the holder 1. Accordingly, the brush per se can be securely held at the leaf spring holder 1 without use of adhesive agent whatsoever.

On the other hand, however, when the brush is made of a material having a high graphite content, the opposing side surfaces 9, 9 of the brush head part 6 is scraped off at the time of its insertion into the perforated opening 2 by the sides 10 thereof, although, after its insertion, the brush is supported in the leaf spring holder 1 by the friction-contact between the brims 10, 10 of the perforated opening 2 and the corresponding side surfaces 9, 9 of the head part 6. Then, with a view to preventing the brush head part 6 from slipping out of the perforated opening 2, an electrically conductive adhesive agent is applied to the fitted part of both members, and is dried by heating to fix both of them together.

As described in detail in the foregoing, since the present invention makes it possible to cause the brush to be held at the leaf spring holder without use of the conventional expedients such as caulking of the brush to the holder, or forming of resilient pawls at the opening of the leaf spring plate, and others, the number of working steps in the assembly of the brush and the leaf spring plate can be reduced to adapt the manufacturing process to the automated system. As the result of this, effect of the industrialized mass-production and reduction in the manufacturing cost in the brush device can be realized.

Further, as the brush according to the present invention is formed by compressing the structure in the direction of arrow shown in FIG. 3 at the time of shaping, the size of the breadth at the side surfaces 7, 7 of the head part 6, which is in a particular relationship with the perforated opening 2 in the leaf spring holder 1 can be indexed more accurately then by forming the same in a cavity of a shaping mold, with the consequence that no inconvenience whatsoever will be brought about in assembling the brush and the leaf spring holder.

Although the present invention has so far been described with reference to a particular embodiment thereof, it should be borne in mind that the embodiment is merely illustrative and not so limitative, and that any change and modification may be made by those persons skilled in the art, within the spirit and scope of the present invention as set forth in the appended claims.

What is claimed is:

1. A brush device for commutator of a miniature electric motor which comprises in combination:

a. a brush holder made of a leafsspring having an opening perforated in one part thereof to hold therein said brush, and having a fitting part to fix the same to the main body of the electric motor formed at the other part thereof; and b. a brush of a size adapted to be inserted and held in said opening perforated in said brush holder, said brush consisting of a main body and a head part integrally formed on said main body in a size different from said main body, and said head part being forcibly inserted into said perforated opening in said brush holder.

2. The brush device as set forth in claim 1, in which said brush main body is in a square configuration.

3. The brush device as set forth in claim 1, in which said head part of the brush integral with said main body is in a rectangular configuration.

4. The brush device as set forth in claim 3, in which one of the opposing pairs of the parallel side surfaces of said brush head part are of substantially same breadth as the length of the corresponding opposing pairs of parallel sides of said perforated opening in said brush holder, and the other opposing pair of the parallel side surfaces of said brush head part are narrower in breadth than that of said one opposing pair of the parallel side surfaces contiguous thereto, but are slightly wider than the length of the corresponding opposing pair of the parallel sides of said perforated opening in said brush holder.

5. The brush device as set forth in claim 1, in which stages or shelves formed at the boundary between said head part and said main body of the brush due to difference in size therebetween serve as stopper means to contact the lower surface of the brims of said perforated opening in said brush holder at the time of assembly of the brush main body to said brush holder.

6. The brush device as set forth in claim 4, in which the stages or shelves formed on both side surfaces at the boundary between said brush head part and said brush main body serve as stopped means to contact at least a pair of parallel, opposing sides of said perforated opening in said brush holder at the time of assembly of said brush to said brush holder.

7. The brush device as set forth in claim 4, in which edge parts formed at a portion where the top surface part of said brush head part meets with the pair of parallel, opposing side surfaces having the substantially equal breadth to the length of a pair of parallel opposing sides of said perforated opening corresponding to said pair of opposing side surfaces are chamferred, said chamferred portions of said edges serving as a guide at the time of inserting said brush head part into said perforated opening in said leaf spring holder for assembly.

8. The brush device as set forth in claim 1, in which, after insertion into said perforated opening in said leaf spring holder of said head part of said brush, an electrically conductive adhesive agent is applied to the fitted portion of said brush head part and said brush holder.

9. A brush device for commutator of a miniature electric motor which comprises, in combination:

a. a brush holder made of a leaf spring having a rectangular opening or hole perforated in one end part of said brush holder to receive and hold therein said brush as inserted thereinto, and having a fixing portion formed at the other end part of said brush holder so as to be readily fixed to the main body of the electric motor; and b. a brush consisting of a main body and a head part integrally formed on said brush main body, said brush main body being of a square shape and said head part being of a rectangular shape in a substantially same size as said rectangular perforated opening in said brush holder so as to be snugly inserted and held in said perforated opening, breadth of one of the opposing pairs of the parallel side surfaces being substantially equal to the length of one of the opposing pairs of the parallel sides of said perforated opening in said brush holder, while breadth of the other opposing pair of the parallel side surfaces being narrower than the breadth of said one opposing pair of the parallel side surfaces contiguous thereto, but slightly broader than the length of the other opposing pair of the parallel sides of said perforated opening in said brush holder, thereby forming stages or shelves at both side surfaces on the boundary between said brush main body and said brush head part to serve as stopper means which contact the pair of the longer sides of the perforated opening in said brush holder, at the time of assembling said brush to said brush holder.

10. The brush device as set forth in claim 9, in which said brush holder made of leaf spring is in a thin strip form of a narrow breadth, is bent in an inverted L-shape, and provided with reinforcing glanged portions at both sides thereof along the lengthwise direction in the vicinity of one end portion where said opening is perforated.

11. The brush device as set forth in claim 9, in which said brush, inclusive of both brush main body and brush head part integral with the former, is subjected to compression along the direction of the longer side surfaces of said brush head part at the time of forming the same.

* * * * *